Aug. 31, 1965    R. S. ENABNIT    3,203,461

TIRE CONTAINING VIBRATION DAMPERS

Filed April 3, 1963

*INVENTOR.*
ROBERT S. ENABNIT

BY

*J. B. Holden*
ATTORNEY 3,203,461
TIRE CONTAINING VIBRATION DAMPERS
Robert S. Enabnit, Cuyahoga Falls, Ohio, assignor to The Goodyear Tire & Rubber Company, Akron, Ohio, a corporation of Ohio
Filed Apr. 3, 1963, Ser. No. 270,354
2 Claims. (Cl. 152—362)

This invention relates to a pneumatic tire that possesses less harsh riding characteristics. More particularly, the invention relates to a pneumatic tire that contains radially aligned, circumferentially spaced rubber cushions positioned so that they provide a resilient shear member between the tire bead and the rim.

With the advent of the modern automobile the riding characteristics have become very smooth so that irregularities in the surface of the pavement are more noticeable to the occupants. In particular, the driver has a greater awareness of pavement irregularities in that the shock is transmitted through the steering wheel. The pavement irregularities also produce transient or decaying vibration of the numerous car body panels and the attachments thereto. The vibration of car body panels produces interior noise which leads to a sensation of a harsh ride.

The ordinary automobile driver is sensitive to very minute vibrations at the steering wheel even as small as one ten thousandths of an inch; therefore, any reduction in the amount or magnitude of vibration occurring in the steering wheel will improve the overall ride sensations in the vehicle. Another factor that is very important today is the type and intensity of audible sound that reaches the occupants of an automobile. The various background noise associated with the engine, gears, airflow about the exterior of the body, etc., all have been remarkably reduced so that the noise and vibration originating at the tires as a result of contact with the road surface is often very pronounced. This sound may be in the form of a rumble or roar resulting from the transmission of many tiny, rapid, random impacts to the car body, or a more occasional larger sharp impact which produces a decaying panel vibration which would be heard as a rattle, clank or bang.

The sound waves produced by the road and tires can be very distracting to the motorist even though he is not aware of the nature of the sound. Driver fatigue is greatly enhanced and brought on much more readily when the motorist is subjected to sound, particularly when relatively high frequency components are present such as occurs with sharply decaying and irregularly repeated vibration.

Sometimes both vibration and noise are caused because the tires on a vehicle are not perfectly in balance. Even the best of tires do not have perfect distribution of mass about a central axis, thus the unbalanced condition can produce the so-called tire thump. When this discrepancy is such as to produce a sharp impact each revolution the transmitted forces produce a jolt or jerk and audible clatter in the passenger compartment.

The present invention is an improvement over the ordinary tire in that it is specifically designed to reduce the effects resulting from shocks that occur at the tire and are transmitted directly to the rim through the side wall and subsequently affect the car body itself.

The primary object of this invention is to provide a vehicular tire that transmits to a lesser degree certain characteristics of impacts which are responsible for a large amount of the sound and vibration giving rise to a sensation of harsh or poor quality ride in the vehicle upon which the tire is mounted.

Another object of the invention is to provide a vehicular tire that will suppress that portion of continuous sound which is generated by the tire tread as it makes contact with the pavement and which is transmitted directly through the tire wall, frame, and car body.

A further object of the invention is to provide a vibration shear acting dampening cushion between the tire carcass and the rim upon which it is mounted.

Other objects will become readily apparent from the remainder of the specification and claims.

The foregoing objects are carried out by the means described below and pictorially represented in the accompanying drawings. It is to be understood, of course, that it is not intended to limit the invention to the exact details shown and described herein.

In the drawings FIGURE 1 is an isometric view partially in section showing the cushion means embodying the invention.

Figure 1:
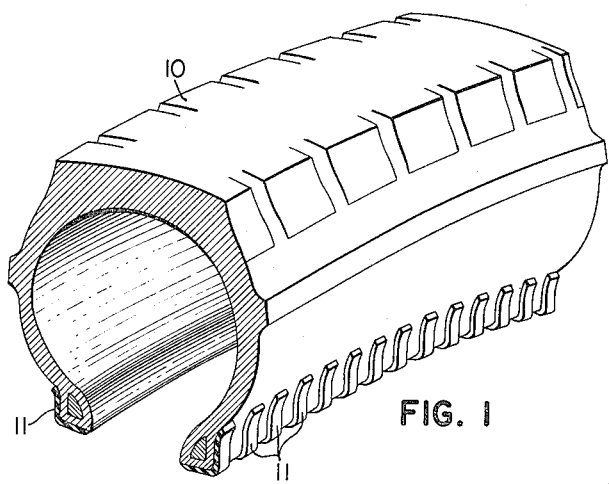

Referring to FIGURE 1 of the drawing, a tire casing is shown at 10. On the bead portion of the tire are located radially aligned elastomeric cushions 11 that are preferably an integral part of the tire. The material of the cushions may be the same as that which forms the sidewall of the tire. The rubber cushions are spaced circumferentially about the bead area and are positioned on each exterior side of the tire.

Figure 2:
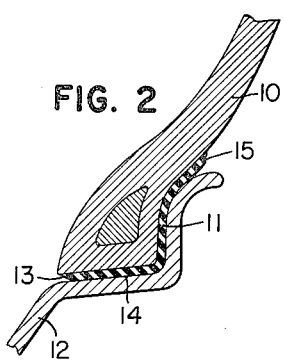
FIGURE 2 shows an enlarged portion of a tire casing having rubber shear cushions interposed between the sidewall and the rim.

FIGURE 2 shows an enlarged cross section of tire casing 10 as it would be mounted on steel rim 12. The rubber cushions 11 terminate at the toe of the bead with sloping end portion 13. Cushion 11 extends from the toe at 13 over rim contact area 14 and up over the sidewall where it terminates with end portion 15. The end 15 is located well above the point where the rim last contacts the tire sidewall. Thus it can be seen that a substantial load bearing surface is presented between ends 13 and 15.

Figure 3:
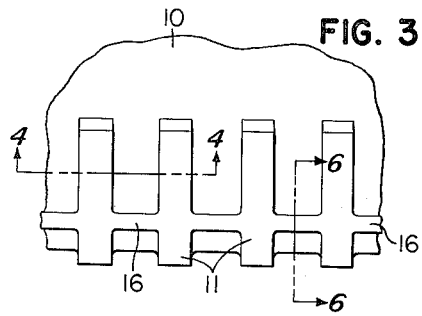
FIGURE 3 shows a side view of the tire having means for incorporation of the invention in a tubeless tire.

FIGURE 3 is a side view of cushions 11 which shows their spaced relationship with respect to tire casing 10. Also shown in FIGURE 3 are air sealing blocks 16 that enable the tire to be used without a tube. Blocks 16 are smaller in cross section than cushions 11 and are preferably located on the sidewall of tire casing 10 in the rim contact area. It would also be considered within the scope of the invention to place sealing blocks 16 in one or more rows. Sealing blocks 16 can be located anywhere between end 13 and end 15 so long as they fall within the load bearing area and make contact with the rim.

Figure 4:
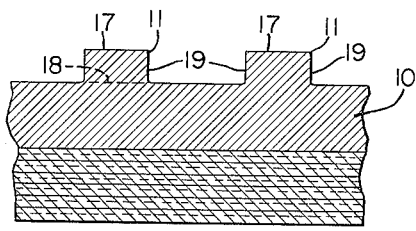
FIGURE 4 is an enlarged view taken through section 4—4 of FIGURE 3. This represents a no-load configuration.

FIGURE 4 is an enlarged cross section taken along lines 4—4 of FIGURE 3. Cushion 11 has an exterior portion 17 and an interior portion 18 where it is joined or contacts tire casing 10. The cushions 11 have vertical sides 19 which are preferably parallel.

Figure 5:
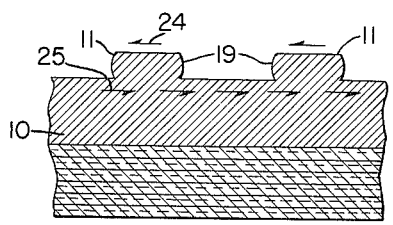
FIGURE 5 is a cross section similar to FIGURE 4 except that it represents the loaded condition of rubber cushions located on the exterior of the tire casing.

FIGURE 5 shows a cross section of cushions 11 in the loaded condition. The normally planar sidewalls 19 are bowed outward because of the transfer of load from the tire casing 10 to a typical rim such as 12.

Figure 6:
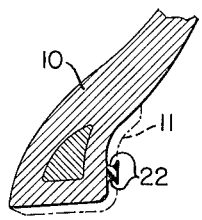
FIGURE 6 is a cross-section taken along section 6—6 of FIGURE 3 which shows a typical sealing bar.

FIGURE 6 is a cross-section taken along section 6—6 of FIGURE 3. Shown therein is a typical sealing bar 16 with sloping sidewalls 22. The exact configuration of the bar sidewalls is not critical so long as the overall cross section is reduced at some section so that the sealing bar will have a softer spring rate, thus not impede the action of cushions 11.

Figure 7:
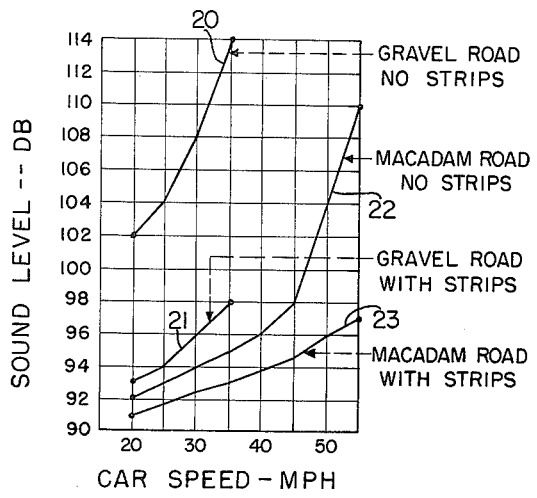
FIGURE 7 is a graph of typical test results showing the use of cushions with a tire.

FIGURE 7 is a graphical representation of a tire mounted on an automobile then run over road surfaces of varying roughness. The units as seen along the abscissa of the graph represent the speed of the automobile in miles per hour. The units marked along the ordinate represent the overall sound intensity in decibels (db) within the passenger compartment of the automobile. The decibel is, of course, a well-known incremental measurement of sound change and as such merits no further discussion herein. Curve 20 is the result of recording the db level as a car equipped with normal tires was run over a freshly graveled road. Curve 21 shows the attenuation in db level attained using the same car, road, and tire after rubber cushions were inserted between the tire beads and the rims. Curve 22 is similar to curve 20 in that the tire contained no cushions; however, the road surface was relatively smooth in that it was a macadam road which would produce many tiny impacts rather than large shocks. Curve 23 also shows a reduction in sound level attained by incorporating the rubber shear cushions between the rims and tire beads. The sound energy was measured in the rear center passenger area of the car and was situated two feet from the floor level. The cushions used for the above test were 0.25 inch (6.35 mm.) wide, 0.125 inch (3.17 mm.) high and spaced apart 0.1875 inch (4.76 mm.). The exact dimension can, of course, vary somewhat from the above dimensions without departing from the scope of this invention.

The cushions of this invention have enough resiliency to allow shear forces 24 as shown in FIGURE 5 to act in one direction at surface 17 and reacting shear forces 25 which act at area 18. In addition the cushions can deform in a direction normal to shear forces 24 and 25. For this reason, ample space is provided between each cushion so that sidewalls 19 will not contact each other.

The foregoing description of the invention describes rubber cushions placed between the tire bead and mounting rim for the purpose of attenuating the vibration and shock generated by the revolving wheel. The cushions are designed and spaced so that they will act as small shear springs, yet will support the vehicular weight imposed upon them.

While certain representative embodiments and details have been shown for the purpose of illustrating the invention, it will be apparent to those skilled in this art that various changes and modifications may be made therein without departing from the spirit or scope of the invention.

I claim:

1. A pneumatic tire having sidewalls terminating with a bead portion and adapted to be used with a rim and a plurality of circumferentially equally spaced, radially aligned, elongate elastomeric cushions that are an integral part of the sidewall and extend in an uninterrupted length over the exterior portion of the bead from the toe of said bead to an area on the sidewall of the tire that is located radially outward from the contact portion of a rim, said cushions having spaced apart sides that are parallel to each other and are perpendicular with respect to the sidewall of said tire casing said cushions having a width not less than the space between the cushions and a load bearing surface all points of which are located equidistant from the tire sidewall a distance not less than half of said width, said cushions having tapering ends that taper from said top surface to said tire sidewall, and at least one circumferentially aligned row of sealing bars that interconnect said cushions, thus preventing the escapement of air from the tire.

2. A tire as claimed in claim 1 and adapted for passenger automobile use in which the cushions are about 0.25 inch wide, about 0.125 inch in depth, and are spaced from each other about 0.1875 inch.

References Cited by the Examiner

UNITED STATES PATENTS

| | | | |
|---|---|---|---|
| 1,396,515 | 11/21 | McClevey | 152—384 |
| 1,915,963 | 6/33 | Wait | 152—384 |
| 2,026,161 | 12/35 | Collins | 152—351 |
| 2,587,470 | 2/52 | Herzegh | 152—330 |

FOREIGN PATENTS

| | | |
|---|---|---|
| 785,094 | 10/57 | Great Britain. |
| 1,138,358 | 1/57 | France. |

ARTHUR L. LA POINT, *Primary Examiner.*